Feb. 12, 1952 V. G. VAUGHAN ET AL 2,585,704
THERMOSTAT WITH MICROSCOPIC MAT FINISH
Filed Aug. 18, 1948 2 SHEETS—SHEET 1
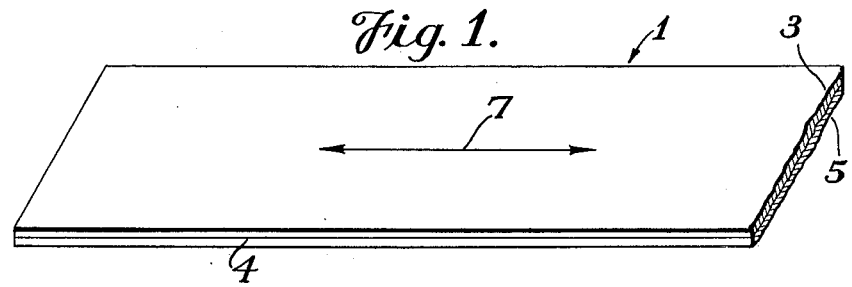
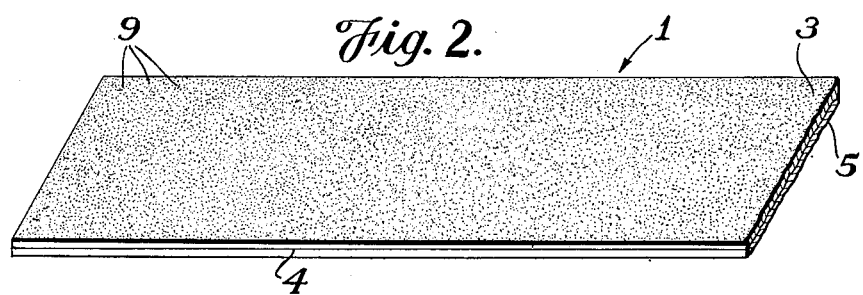
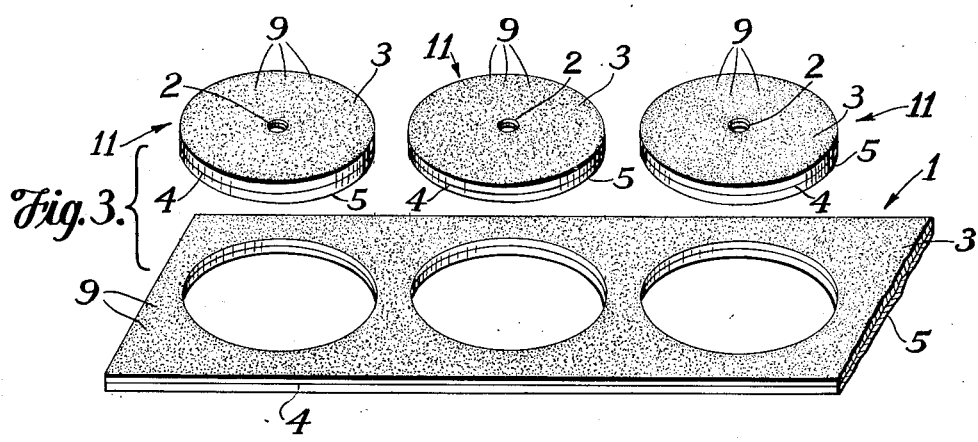
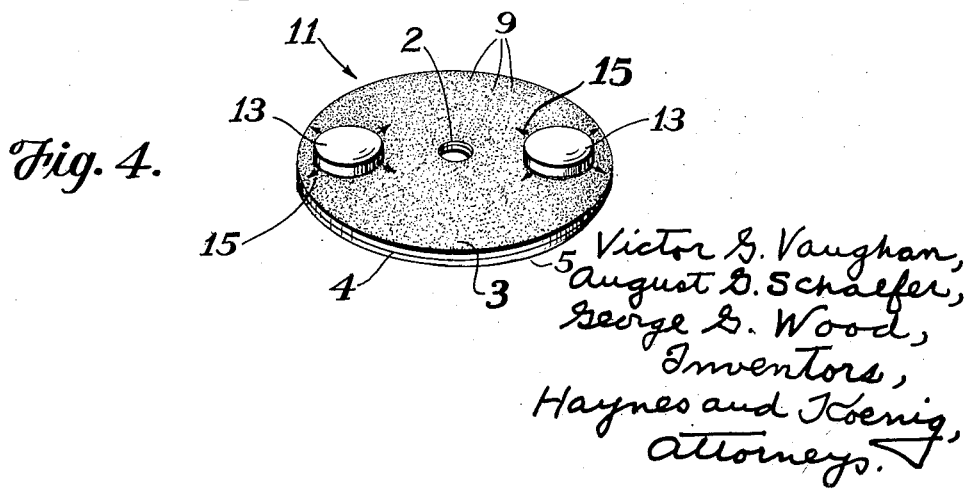
Victor G. Vaughan,
August D. Schaefer,
George G. Wood,
Inventors,
Haynes and Koenig,
Attorneys.

Feb. 12, 1952 V. G. VAUGHAN ET AL 2,585,704
THERMOSTAT WITH MICROSCOPIC MAT FINISH
Filed Aug. 18, 1948 2 SHEETS—SHEET 2

Victor G. Vaughan,
August G. Schaefer,
George G. Wood,
Inventors,
Haynes and Koenig,
Attorneys.

Patented Feb. 12, 1952

2,585,704

UNITED STATES PATENT OFFICE 2,585,704

THERMOSTAT WITH MICROSCOPIC MAT FINISH

Victor G. Vaughan and August G. Schaefer, Attleboro, and George G. Wood, Norton, Mass., assignors to Metals & Controls Corporation, Attleboro, Mass., a corporation of Massachusetts Application August 18, 1948, Serial No. 44,924

3 Claims. (Cl. 297—15)

This invention relates generally to thermostats and their manufacture; with regard to certain more specific features to composite thermostatic control elements; and more particularly to multimetallic snap-acting thermostatic discs.

Among the several objects of the invention may be noted the provision of an improved method of manufacturing thermostatic controls of consistently higher quality at greater production rates and at lower costs; the production of thermostatic control elements which have more uniform and accurate operating responses; the provision of snap-acting multi-metallic thermostatic discs having better snap action; and the provision of discs of the class described having increased fatigue resistance and longer reliable operating lives. Other operations will be in part obvious and in part pointed out hereinafter.

The invention accordingly comprises the elements and combinations of elements, steps and sequence of steps, features of construction and manipulation, and arrangements of parts which will be exemplified in the structures and methods hereinafter described and the scope of the application of which will be indicated in the following claims.

In the accompanying drawings, in which one of various possible embodiments of the invention is illustrated, Fig. 1 is an isometric view of typical bimetallic sheet material in strip form;

Fig. 2 is a view similar to Fig. 1 illustrating a surfacing step;

Fig. 3 is a view illustrating a disc blanking step;

Fig. 4 is an enlarged perspective view of a blanked disc showing contacts added thereto;

Similar reference characters indicate corresponding parts throughout the several figures of the drawings. It will be understood that the drawings are diagrammatic, their layer thicknesses being exaggerated for the purposes of clarity.

Figure 5:
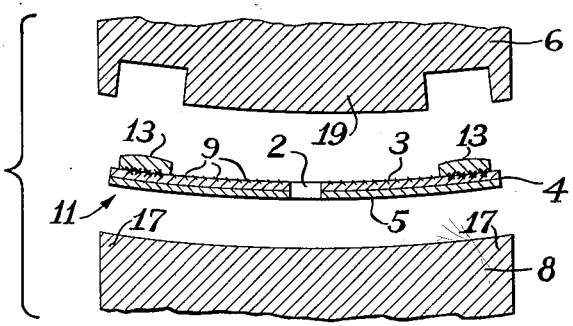
Fig. 5 is a cross section of a disc such as shown in Fig. 4 but after the performance of certain intermediate steps including a dishing operation exemplified by the dies shown.

In the comparatively critical operations required to produce thermostats, particularly of the composite snap-acting varieties, it is in general difficult to increase production rates, minimize waste, and lower costs without sacrificing the quality and uniformity of the output. By means of the present invention some of these difficulties are overcome and a superior product obtained. The invention will be described by way of example in connection with a so-called Spencer bimetallic snap-acting disc element such as shown in United States Patent 1,448,240.

While the exact theory of the invention to be described is not known with absolute certainty, the results are positive and definite. For the purpose of better comprehension certain provisional hypotheses will be set forth but they are not to be understood as limiting.

Referring now more particularly to Fig. 1, there is shown at numeral 1 a bimetallic sheet, composed of two layers of materials 3 and 5 which have been interfacially bonded, as for example by heating them to a suitable welding temperature, and rolling under pressure in the well-known manner, forming a continuous interfacial weld indexed 4. One layer, such as 3, is of higher coefficient of thermal expansion than the other layer 5, so that upon subsequent heating, the bimetallic sheet I will deform convexly on the side 3 and concavely on the side 5. Upon cooling the reverse effect will occur.

Suitable materials for the sheets may for example be: for sheet 3 either nickel, or a chrome-nickel alloy consisting of about 22% nickel and 3% chromium with the balance iron; and for sheet 5 Invar, which is a nickel-steel consisting of about 36% nickel and the balance iron. Other materials of different coefficients of expansion may be used, as also other numbers of layers if properly selected and related, and the term "composite" comprehends these. It is to be understood that while methods other than rolling might be suitable for bringing together the sheets 3 and 5 under welding pressure, rolling is the most practical process today. Such rolling is accomplished in successive passes through a rolling mill during which the sheets cool from the welding temperature and become welded into one bimetallic sheet I. With the aid of the usual suitable pickling and cleaning operations the sheet I is ultimately cold-rolled to proper final thickness of .010 inch, for example.

Since the two different materials of the layers 3 and 5 have different cold working characteristics it is believed that there may be imparted to them during the cold rolling skin stresses which may be directionally oriented. In any event the outer surfaces of the layers 3 and 5 under a microscope show unidirectionally oriented surface grain. This is indicated by the double-pointed arrow 7 on Fig. 1 which points in the direction of rolling. However, to the eye the outer surfaces of layers 3 and 5 present a smooth, shiny, mirror-like reflective or specular appearance. These shiny surfaces under heat treating operations required for subsequently making thermostatic discs become irregularly and uncontrollably blotched with substantial areas of color variation. So far as the eye is concerned these do not follow said grain characteristics, being large in character and covering large portions of the surfaces. These irregular variations are not only poor in appearance but they irregularly effect the heat absorption and emission characteristics of the finished thermostatic discs which are subsequently made from the strip. The result is that a substantial number of time-consuming compensating manufacturing operations and adjustments have been required in order to have as many as possible of the thermostats manufactured from the discs meet specifications. This has also involved numerous completed thermostats failing to pass inspection, which has increased unit costs.

Also, during the steps of welding onto the disc the electrical contacts which are generally used for current controls this smooth shiny specular characteristic has favored a large so-called flashing, which is in effect an undesirable extrusion of weld metal overlying the surface adjacent to the welded contact. Such flashing is not desirable because of some variation in the conductive characteristics of the discs around the contacts produced thereby. This also may subsequently interfere with proper disc formation. Furthermore the flashing may flake loose in the final thermostat and cause trouble.

Referring now to Fig. 2, the next step in the manufacturing process is to provide an integral mat finish on both or either one of the outside surfaces of the strip 1, preferably the surface of the component 3 of the high coefficient of expansion. Such a finish is indicated at 9 and is constituted by the material of the surface itself, thus physically breaking up its shiny specular character. This matting is very fine being of a substantially non-roughening, microscopic character and both to the eye and microscope presents a random orientation. The microscopic fineness is adapted to avoid any deleterious interference with the thermostatic properties of the very thin layers which are only a few thousandths of an inch thick. It is substantially or completely of a non-directional character which breaks up the specular reflective characteristic and produces a diffuse reflective characteristic. The non-roughened surface is effected with a minimum (if any) of metal removal and preferably by a process which will exert an even skin peening action of microscopic proportions. On a Brush surface analyzer or profilometer the profile wave form is indicated by a root mean square reading of a few microinches and the mean distance between profile peaks is of a similar order.

So far as optical properties are concerned the result is that the surface takes on a uniform dull mat color. So far as heat waves are concerned the surface will throughout its area have a uniform capacity for absorption or emission of heat, other things being equal. As to the peening action, oriented or other skin stresses tend to be relieved in a uniform manner.

A suitable method of producing the desired non-roughening microscopic mat surface is by air blasting against it very fine and hard abrasive particles or grit. The blasting interval is only such as to obtain the fine mat effect so as to minimize removal of material. It is desirable that a water vehicle be employed. For example, a mixture of a water carrier and novaculite grit particles of the order of ten microns in diameter are projected against the surface with air at a high velocity from suitable nozzles. This is sometimes referred to as liquid honing and is to be distinguished from sand blasting by ordinary silica sand which roughens the surfaces to a degree that the effects described herein are lost and undesirable effects obtained, among which is destructive warping action on the thermostatic material which for a large amount of the production in this field is very thin, as above indicated. Other finenesses of grit may be used but we have found the above to be economically satisfactory. Apparatus for the purpose is known (see for example Machinery for March 1948, pages 158–161). It is preferable that the projection be distributed over the treated surface as evenly as possible.

It is also feasible to use a dry blast of said particles involving no liquid carrier with similar effects. However, the said wet blasting process (sometimes called vapor blasting) has less dust hazard. Either the wet or dry blast is controlled in the time of application so as not appreciably to remove metal but simply to mat or etch the surface and give it the desired uniform dull finish. Whatever peening action occurs is accomplished within the short time of the blast application involved to obtain the desired finish without substantial removal of material.

Referring next to Fig. 3, a blanking step is illustrated in which discs 11 are punched from the prepared sheet 1. These are diagrammatically shown as being punched up in order to show the mat surface in the drawing. Obviously the usual downward punch motion is employed. At this time the discs are also perforated as shown at 2. The punching may be done from the non-mat side 5 as shown or reversely. Also, the punching may be done before the matting operation, the latter being applied to the individual discs. This order of events is optional, depending upon whether it is more convenient to blast the larger sheet strips or the smaller discs.

Next (Fig. 4) the usual electrical contact buttons 13 are spot or projection welded to the mat side of the disc 11. When this takes place the usual radial surface flashing of welding metal which occurs, for example, at the arrows 15 is minimized considerably. Excessive flashing has been a source of inequality in the case of specular surfaced discs and is undesirable. Apparently the mat surface at the weld region better meets the conditions for a good weld without flashing to the former extent.

The next step is to heat treat the mat surfaced disc 11 with the contacts 13 in place. This is preferably done in the usual way by immersing the discs in a molten salt bath (sodium and potassium nitrate and nitrite) such as used for heat treating and tempering steel, for 1½ hours at 750° F. The discs are then washed and dried. The result, so far as the finish is concerned, is that the mat surface which was of a uniform lighter color is converted to a uniform darker color with no appreciable change in the mat characteristics.

The next step is illustrated in Fig. 5, wherein the finished disc is shown in cross section as it normally appears after having been dished by dies such as 6 and 8. In the present example it has a final position concave in shape on the side of high coefficient of thermal expansion, that is, on the side of the layer 3 which has the uniform dull colored mat surface. Dishing is accomplished in the usual way by placing a peripheral support as shown at 17 and centrally loading as shown at 19 until the disc takes a set corresponding to the temperature at which it is desired to have the disc snap from one curvature to another. This is called setting in the temperature and the complete process is well known in the art. For example reference may be had to U. S. Patent 1,593,511.

Finally the discs are given a so-called aging heat treatment consisting in an immersion in said salt bath for 20 minutes to ½ hour at 700° F. They are then washed and dried.

Figure 6:
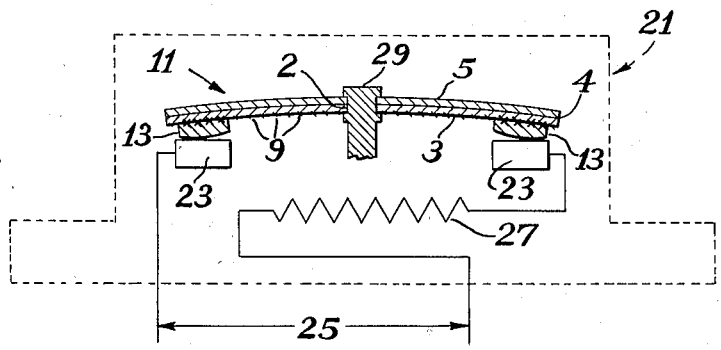
Fig. 6 is a schematic diagram of a thermostatic circuit breaker embodying the invention and being shown in its closed position; and, Fig. 7 is a view similar to Fig. 6 except that the circuit breaker is shown in its open-circuit position.
Figure 7:
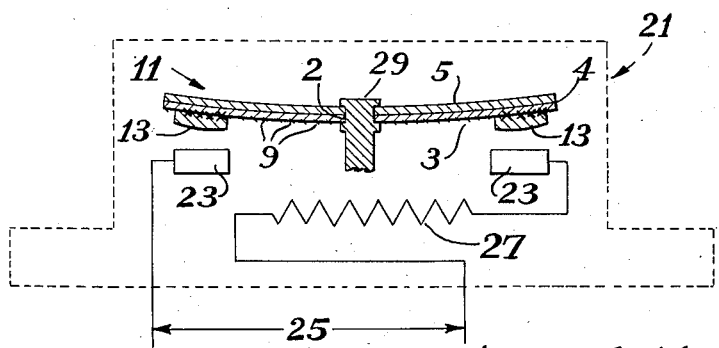

In Figs. 6 and 7 is shown a schematic application of a finished disc to a thermostatic switch 21. This switch comprises a support which carries fixed contacts 23 in a circuit 25 for a heater wire 27, the latter also being mounted on the support. The disc is anchored semi-loosely at its hole 2 on a post 29 forming part of the support so that it may freely snap, in response to temperature changes, from the normal circuit closing position shown in Fig. 6 to the circuit opening shown in Fig. 7. Its mat side 9 is opposite the heater wire 27 so that the latter may radiate directly against the finish. The wire 27 is in a circuit to be controlled such as for example a circuit including in series a motor winding to be protected against excessive current. Upon the occurrence of excessive current in the circuit both the disc and heater rise in temperature. Heat radiates directly from the wire through the even finish into the disc (which is itself heating) aiding the latter to rise promptly to the temperature at which it suddenly changes curvature with a snap action (see Fig. 7). This opens the overloaded circuit. Upon cooling, the disc if calibrated for automatic resetting, will snap back to circuit closing position. Or if the disc is calibrated to remain open upon a substantial drop in temperature, it will require manual resetting for closing the circuit. In any event the more uniform action can be expected from discs made with the mat surface. It is to be understood that the invention is also effective without the heater wire, in which case heating is all due to the resistance of the disc itself. This is because the mat surface makes more uniform the emissivity as well as the absorptivity of the matted surface. In all cases the actions of several equal discs are more uniform, whether responding to heating or cooling and whether self-heated or heated by control heaters or both.

The mat finish may be used on either one or both sides of the thermostatic element or disc. In the example above given it is on the side of high coefficient of thermal expansion because this side is opposite the control heater. The result in all cases is an even influx or efflux of heat and a more uniform reaction of the thermostat to the current conditions in the circuit.

The fact that responses are more uniform considerably reduces the number of rejects because when once a manufacturing routine is set there are fewer sporadic variations to cause the rejects. That is, the mat surface makes more constant the absorptivity, emissivity, weld flash, weld surface, skin stress and perhaps other factors so that the entire manufacturing process is rendered more reliable and much more economical. For example, a more uniform response of the discs in respect to time reduces testing time. Formerly in one of the manufacturing tests the production limit of opening time was over a range from 8 seconds minimum to 15 seconds maximum. By means of the invention this time may be cut to a range from 9½ seconds to 11½ seconds. This results in an important saving in time in the mass production of thermostats. This uniformity of response is also desirable in the use of the thermostat, particularly in applications such as motor protective controls.

Also, formerly compensations were needed in the distances between various discs and the control heaters in order to obtain an approximation to uniformity of response. This compensation was intended to take care of the differences in heat absorption caused by the mottling of the discs. By means of the invention the necessity for this adjustment is minimized, again resulting in an important saving in the mass production.

The discs of a given production run respond according to a less erratic pattern and consequently there may be obtained a much better adaptation of a given thermostatic rating for a line of protective thermostats to a given line of motors, for example.

Another method of providing the discs with the desired surface, applicable where finish is desired on two sides and wherein the finishing operations are to be performed upon the discs after the blanking step (as distinguished from finishing the parent strip) is as follows:

Discs are punched from the usual composite strip shown in Fig. 1. A number of these are then placed in a tumbling barrel with fine abrasive grit such as powdered pumice stone or the like. They are then tumbled until the abrasive has randomly matted the surfaces to the degree above specified, that is, until all specular properties are lost and a dull mat appearance results. This finish will appear on both sides. The contacts are then welded to the desired side and the process completed, as already made clear. The result, as in the case of the particle-blasted surfaces, is a fine mat surface randomly oriented which is an integral part of the thermostatic sheet itself.

In view of the above, it will be seen that the several objects of the invention are achieved and other advantageous results obtained.

As many changes could be made in the above constructions, products and methods without departing from the scope of the invention, it is intended that all matter contained in the above description or shown in the accompanying drawings shall be interpreted as illustrative and not in a limiting sense.

We claim:

1. A thermostatic element comprising a composite sheet-metal snap-acting dished disc having at least one face composed of a diffusely reflecting randomly oriented microscopic mat finish of uniform color, the root mean square of the profile of said finish being of the order of several microinches, and resulting in a fineness adapted to be substantially non-roughening and adapted to prevent color blotching upon a liquid-bath heat treatment of the disc at several hundred degrees Fahrenheit.

2. A thermostatic element comprising a composite sheet-metal snap-acting dished disc having at least one face composed of a diffusely reflecting randomly oriented mat finish of uniform color, at least one electrical contact welded over said finish, said mat finish being of a microscopic fineness, the root mean square of the profile of which is of the order of several microinches, the fineness being sufficient to inhibit weld flashing and to prevent color blotching upon any subsequent heat treatment of the disc at several hundred degrees Fahrenheit.

3. A thermostatic element comprising a flexible composite-sheet-metal dished member which is thin enough to be snap-acting upon a change of temperature, said member having at least one face composed of an even diffusely reflecting but randomly oriented microscopic mat finish, the root mean square of the profile of said finish being of the order of only a few microinches, whereby the superficial surface of the finish is evenly heat transmitting throughout but is substantially equal to the area of said member.

VICTOR G. VAUGHAN.
AUGUST G. SCHAEFER.
GEORGE G. WOOD.

REFERENCES CITED

The following references are of record in the file of this patent:

UNITED STATES PATENTS

| Number | Name | Date |
|---|---|---|
| 1,852,543 | Spencer | Apr. 5, 1932 |
| 1,947,927 | Vorwerk | Feb. 20, 1934 |
| 2,137,078 | Dorfman | Nov. 15, 1938 |
| 2,152,934 | Trent | Apr. 4, 1939 |
| 2,199,388 | Bolesky | May 7, 1940 |
| 2,249,723 | Orr | July 15, 1941 |
| 2,288,788 | Clark | July 7, 1942 |
| 2,317,830 | Vaughan | Apr. 27, 1943 |
| 2,317,831 | Vaughan | Apr. 27, 1943 |